US012194503B2

(12) United States Patent
Nagy et al.

(10) Patent No.: US 12,194,503 B2
(45) **Date of Patent: *Jan. 14, 2025**

(54) SYSTEMS, DEVICES, AND METHODS FOR ENHANCED SORTATION OF DELIVERY ITEMS

(71) Applicant: UNITED STATES POSTAL SERVICE, Washington, DC (US)

(72) Inventors: Michael A. Nagy, Warrenton, VA (US); Dirk H. Sattler, Gainesville, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,618

(22) Filed: Nov. 20, 2023

(65) Prior Publication Data

US 2024/0082880 A1 Mar. 14, 2024

Related U.S. Application Data

(63) Continuation of application No. 18/056,950, filed on Nov. 18, 2022, now Pat. No. 11,858,005, which is a (Continued)

(51) Int. Cl.
*B07C 3/14* (2006.01)
*B07C 3/00* (2006.01)
*B07C 3/18* (2006.01)

(52) U.S. Cl.
CPC ................ *B07C 3/14* (2013.01); *B07C 3/008* (2013.01); *B07C 3/18* (2013.01)

(58) Field of Classification Search
CPC ........... B07C 7/005; B07C 3/008; B07C 3/18; B07C 3/14; B07C 3/006; B07C 3/10; B07C 3/00; G06Q 10/0836; G06Q 10/08
See application file for complete search history.

(56) References Cited

U.S. PATENT DOCUMENTS 5,794,789 A * 8/1998 Payson ..................... B07C 3/00
209/583
5,881,890 A * 3/1999 Wiley ....................... B07C 7/04
209/703

(Continued)

FOREIGN PATENT DOCUMENTS

CN 108080283 B 4/2020

OTHER PUBLICATIONS

Sattler, Dirk H. (Inventor), Email with subject line "Re: Reminder: for Imm. Review: Draft Patent Application—MH2 Ref. 0126.0022-PRO; USPS Ref. Sort to Light," dated Mar. 26, 2019, showing systems demonstrated to the USPS, 3 pages.

(Continued)

*Primary Examiner* — Patrick H Mackey
(74) *Attorney, Agent, or Firm* — MH2 Technology Law Group, LLP

(57) ABSTRACT

Systems, methods, and devices for designating a location for a delivery item that is being sorted by an operator. The operator scans the delivery address of the item using a particular scanner. Using the delivery address and other information from the scanner that was used, the system determines a sort output location for the item and identifies an indicator device (e.g., an LED device) that corresponds to the sort output location. The system then commands the indicator device to present or display a designator. For example, the indicator device may be commanded to illuminate a light, such as an LED. The operator of the scanner then places the item at the location corresponding to the illuminated light designator.

21 Claims, 6 Drawing Sheets

Related U.S. Application Data continuation of application No. 16/838,214, filed on Apr. 2, 2020, now Pat. No. 11,504,746.

(60) Provisional application No. 62/828,860, filed on Apr. 3, 2019.

(56) References Cited

U.S. PATENT DOCUMENTS

| | | | | |
|---|---|---|---|---|
| 6,073,060 | A * | 6/2000 | Robinson | G06Q 20/042 700/223 |
| 6,246,925 | B1 | 6/2001 | Robinson et al. | |
| 6,370,446 | B1 | 4/2002 | Divine | |
| 6,786,404 | B1 * | 9/2004 | Bonner | B07C 3/00 235/383 |
| 8,239,291 | B2 | 8/2012 | Hoffman et al. | |
| 8,843,231 | B2 | 9/2014 | Ragusa et al. | |
| 11,504,746 | B2 * | 11/2022 | Nagy | B07C 3/18 |
| 11,858,005 | B2 * | 1/2024 | Nagy | B07C 3/14 |
| 2002/0070846 | A1 | 6/2002 | Bastian, II et al. | |
| 2020/0316650 | A1 | 10/2020 | Nagy et al. | |
| 2023/0083482 | A1 | 3/2023 | Nagy et al. | |

OTHER PUBLICATIONS

US Office Action issued in U.S. Appl. No. 16/838,214 on Mar. 23, 2022, 10 pages.

US Office Action issued in U.S. Appl. No. 18/056,950 on Mar. 8, 2023, 16 pages.

* cited by examiner

SYSTEMS, DEVICES, AND METHODS FOR ENHANCED SORTATION OF DELIVERY ITEMS

CROSS-REFERENCE TO RELATED APPLICATIONS

This application is a continuation of U.S. application Ser. No. 18/056,950 filed on 18 Nov. 2022, (now allowed), which is a continuation of U.S. application Ser. No. 16/838,214 filed on 2 Apr. 2020, (now U.S. Pat. No. 11,504,746), which claims the benefit of, and priority to, U.S. Provisional Application No. 62/828,860 filed on 3 Apr. 2019, which are all hereby incorporated by reference in their entireties.

BACKGROUND

Note that, herein, the term "mail" may sometimes be employed interchangeably with "item", "delivery item", "mail piece" or "delivery package"; as used herein, "mail" may also refer in an exemplary sense to U.S. Postal Mail, and may also refer generically to delivery items delivered by any delivery service, government or private, including for example and without limitation the United States Postal Service (USPS), the United Parcel Service (UPS) Corporation, and Federal Express (FedEx) Corporation. The terms "mail," "mail item," "delivery item," "delivery package," "package," and simply "item" are used interchangeably herein, referring generically to deliverable printed matter, flats, letters, packages, parcels, and packaged materials transported by delivery services, whether government or private, such as the USPS, UPS, FedEx, and others.

For purposes of this document, the terms above (e.g., delivery items, etc.) may also refer to bound bundles, containers, or trays which are used to deliberately assemble and transport multiple individual items, such as letters, documents, flats, parcels, small boxes, etc., as a group, at least as an interim aspect of transport.

With most delivery services, such as USPS, UPS, and FedEx, the process of delivering multiple delivery items to various recipients involves sorting the delivery items to ensure the items are carried (by trucks, airplanes, persons, etc.) along appropriate delivery routes. Handling of the delivery items occurs at delivery service processing/sorting facilities, which are typically physical buildings with suitable interior equipment and infrastructure to process delivery items. Among other elements, the processing/sorting facilities may employ extended conveyor systems to internally route and distribute delivery items along various transport paths. These conveyor systems may function automatically, and generally include suitable sensors (e.g., cameras, scanners such as barcode readers, optical sensors, etc.) to read delivery item indicia (e.g., address information in the form or text (such as a name and address) and/or barcodes) and tray labels and the like, and mechanical elements to distribute and route delivery items. These automatic sorting conveyer systems may be referred to as Sorting and Material Handling (SMH) systems.

SMH systems typically sort delivery items (e.g., mail pieces) based on the destination address indicated on the item. The sorting process may include scanning the delivery items to determine a destination delivery code or postal code, such as a USPS Zone Improvement Plan (ZIP) code, for the delivery items. In many cases, postal codes (e.g. ZIP codes) may be represented in a special machine-readable format, such as in a barcode and/or quick response (QR) code format that is easily readable by a scanner or camera.

Typical processing/sorting facilities also implement manual sortation of delivery items by operators, especially for delivery items that cannot be processed by the automatic SMH systems. For instance, manual sortation require operators to scan and/or read delivery item indicia (e.g. the destination address and/or postal code), manually determine sort output locations for delivery items based on the indicia and signs, labels, or the like over the sort output location, and then place the delivery items in the appropriate sort output location according to the indicia and the location's label or sign. In some examples, the sort output areas or locations for manual sortation include racks, shelves, slots, tables, containers, and the like. Examples of containers include mail sacks, carts, trays, bins, and the like.

Existing conventional manual sortation processes are typically slow, inefficient, and error-prone because they require human operators to personally read address information, such as a ZIP code, from each delivery item, find the proper sort location (such as a bin or bag) in the processing/sorting facility that corresponds to the address information from the item, and then place the item at the sort location that was found. Further complicating manual sortation for the operators is the fact that the sort output locations are dynamic and subject to change over time, e.g., when each new batch of delivery items is processed and sorted. Among other problems with the existing conventional manual sortation processes, the human operators may misread or forget the address information from the deliver item; have difficulty and delay locating the proper sort location; place the delivery item in the wrong sort location due to misreading the label/sign for the sort location; etc. Accordingly, it is desirable to develop new systems, devices, and related methods to address these problems and improve the manual sorting and handling of delivery items (e.g., mail) by automatically designating, to the operators, the proper sort output location for each delivery item.

SUMMARY

Described herein as systems, methods, and storage-medium manufactures for designating an output location to a scanner operator that is sorting delivery items. Various implementations may include or use multiple scanners that capture address information from delivery items, multiple indicator devices at multiple sort output locations, a storage device that contains a sort plan, and a computer or processor that is operably connected to the scanners, the indicator devices, and the storage device.

Various implementations of the systems, methods, and storage-medium manufactures may perform operations that include receiving, e.g. from one of the scanners, 1) address information from a delivery item that is to be sorted for delivery and 2) an identifier of the scanner; determining, based on the address information and the sort plan, a specific sort output location for the delivery item; determining, based on the identifier of the scanner, a designator for the scanner; determining which indicator device is at the sort output location; and sending a command to that indicator device that causes that indicator device to present the designator, which indicates to an operator where to place or sort the delivery item.

In some implementations, the indicator device includes multiple multicolor light emitting diodes. In some implementations, the designator is a specific color (e.g., red), and a command is sent to the indicator device that causes the indicator device to illuminate at least one light emitting diode in that specific color.

In various implementations, the operations performed also include sending a cease command to the indicator device that causes the indicator device to cease presenting the designator. In some such implementations, this may be done by waiting for a predetermined time period after sending the command that causes the indicator device to present the designator, and then sending the cease command to the indicator device after the predetermined time period has elapsed. In some other such implementations, sending the cease command may be done by receiving, from the scanner, new address information from a second delivery item and an identifier of the scanner, and then sending the cease command to the indicator device in response to receiving the new address information.

In various implementations, the address information from the delivery item may include a postal code (e.g., a ZIP code). In various implementations, the sort plan includes a mapping of postal codes to sort output locations. In some such implementations, the sort output locations correspond to containers for holding delivery items.

In another implementation, a delivery item sorting system for designating an output location to a scanner operator includes: a scanner that capture address information from delivery items, a plurality of indicator devices at a plurality of sort output locations, a storage device that contains a sort plan, and a processor that is operably connected to the scanner, the plurality of indicator devices, and the storage device. The processor may be configured to perform operations that include: receiving, from the scanner, address information from a delivery item; determining, based on the address information and the sort plan, a sort output location for the delivery item from among the plurality of sort output locations; determining which indicator device from among the plurality of indicator devices is at the sort output location for the delivery item; sending a command to the indicator device that is at the sort output location which causes the indicator device to present a designator that represents the scanner; receiving, from the scanner, second address information from a second delivery item; and sending a cease command to the indicator device in response to receiving the second address information, wherein the cease command causes the indicator device to cease presenting the designator.

In yet other implementations, a method and/or a computer-readable, non-transitory storage medium for controlling a plurality of indicator devices to designate a location for sorting delivery items performs operations. The operations may include: receiving, from a scanner, address information from a delivery item that is to be sorted for delivery; determining, based on the address information and a sort plan, a sort output location for the delivery item from among a plurality of sort output locations; determining which indicator device from among the plurality of indicator devices is associated with the sort output location for the delivery item; sending a command to the indicator device that is associated with the sort output location which causes the indicator device to present a designator that is associated with the scanner; receiving, from the scanner, second address information from a second delivery item; and sending a cease command to the indicator device in response to receiving the second address information, wherein the cease command causes the indicator device to cease presenting the designator.

In still another implementation, a delivery item sorting system for designating an output location to a scanner operator includes: a first scanner that capture address information from delivery items; a second scanner that capture address information from delivery items; a plurality of indicator devices associated with a plurality of sort output locations; and a processor that is operably connected to the first scanner, the second scanner, and the plurality of indicator devices. The processor may be configured to perform operations that include: receiving, from the first scanner, address information from a first delivery item; determining, based on the address information from the first delivery item and a sort plan, a sort output location for the first delivery item from among the plurality of sort output locations; causing a first indicator device that is associated with the determined sort output location to present a first designator that is associated with the first scanner; receiving, from the first scanner, second address information from a second delivery item; causing the first indicator device to cease presenting the first designator, in response to receiving the second address information; receiving, from the second scanner, address information from a third delivery item; and causing a second indicator device from among the plurality of indicator devices to present a second designator that represents the second scanner.

Still other implementations include a method and/or a computer-readable, non-transitory storage medium for controlling a plurality of indicator devices to designate a location for sorting delivery items performs operations. The operations may include: receiving, from a first scanner, address information from a first delivery item; determining, based on the address information from the first delivery item and a sort plan, a sort output location for the first delivery item from among a plurality of sort output locations; causing a first indicator device from among a plurality of indicator devices to present a first designator that is associated with the first scanner, wherein the first indicator device is associated with the determined sort output location; receiving, from the first scanner, second address information from a second delivery item; causing the first indicator device to cease presenting the first designator, in response to receiving the second address information; receiving, from a second scanner, address information from a third delivery item; and causing a second indicator device from among the plurality of indicator devices to present a second designator that is associated with the second scanner.

Combinations, (including multiple dependent combinations) of the above-described elements and those within the specification have been contemplated by the inventors and may be made, except where otherwise indicated or where contradictory The foregoing illustrative summary, as well as other exemplary objectives and/or advantages of this disclosure, and the manner in which the same are accomplished, as well as additional or alternative features or implementations, are further explained within the following detailed description and its accompanying drawings.

DETAILED DESCRIPTION

Figure 1:
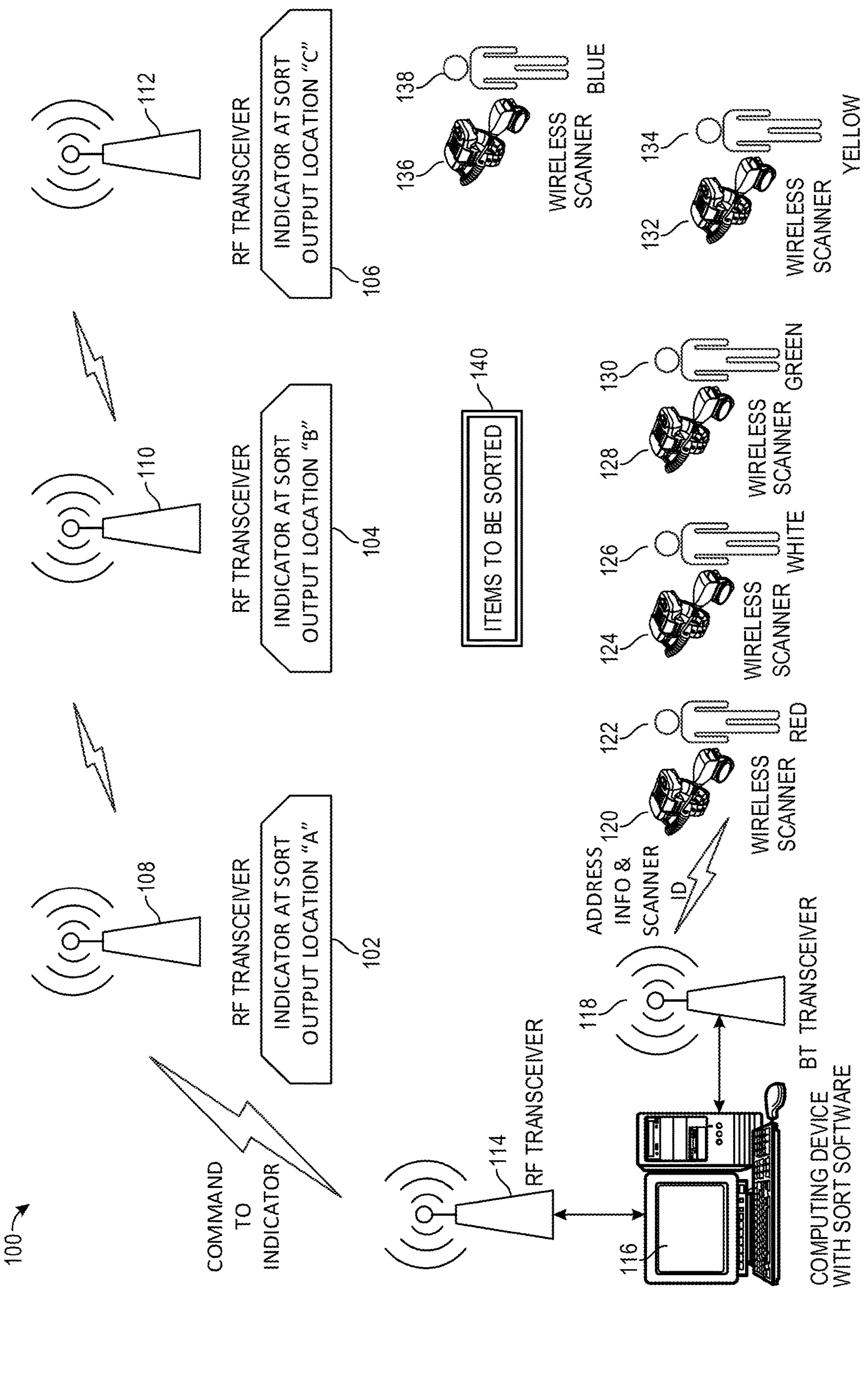
FIG. 1 is a block diagram illustrating an example of a mail processing and sorting system according to one implementation.

In the following description, certain specific details are set forth in order to provide a thorough understanding of various implementations. However, one skilled in the art will understand that the invention may be practiced without these details. In other instances, well-known structures associated with computers, cameras, photo detection, wired or wireless communications, with other digital devices, with data display, and/or with data storage or data transmission, have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open sense, that is, as "including, but not limited to."

Reference throughout this specification to "one implementation" or "an implementation" and the like means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the present disclosure, the systems and methods may be characterized at points in terms of a representative or exemplary system being developed by the United States Postal Service (USPS) and referred to as the USPS Sort to Indicator system or Sort to Light (STL) system.

Various implementations of the Sort to Indicator system improve, and solve several problems associated with, current manual sortation processes and operations. For example, various implementations of the Sort to Indicator system described herein automatically read and process the address information from a delivery item, reducing or eliminating human delay and error in this operation, and automatically determine and designate the proper physical location at which the human operator should place the delivery item, reducing or eliminating human error and slowness in this operation. This enables operators to efficiently and accurately sort mail items to their assigned sort output locations without having to know, memorize, or read the sort plan or the meaning of each sort output location, because all the operators must do is place each delivery item at or in the location specified by an automated designator, for example, a designator such as an illuminated colored LED or light that is over a mail bag. In other words, the designator notifies the human operator regarding where to put the delivery item in accordance with correct sorting.

It will be understood, however, that the implementations described herein, including the Sort to Indicator system and the sorting software, refer to examples of possible implementations only. The claimed invention may encompass other processes and systems as yet undeveloped or to be developed, which employ similar elements, functions and/or operations, which may be designed or developed by parties other than the USPS, and which may be referred to by terms other than the Sort to Indicator system, Sort to Light system, or the like.

FIG. 1 is a block diagram illustrating an example of a Sort to Indicator system 100 for processing and sorting delivery items. The Sort to Indicator system 100 includes delivery items to be sorted 140 (e.g., mail pieces)j; radio frequency (RF) transceivers 108, 110, 112; indicator devices 102, 104, 106, (e.g., computer-controlled multicolor LEDs or lights, for example as described with respect to FIG. 4), at sort output locations, which are operably coupled to the respective transceivers 108, 110, 112; a computing device 116 having a microprocessor(s) (e.g., a server computer, a personal computer, a tablet computer, or the like) that executes instructions, such as sort software; an RF transceiver 114 that is operably coupled to the computing device 116 and that communicates with the RF transceivers 108, 110, 112; another RF transceiver 118, (e.g., a Bluetooth transceiver 118) and that is also operably coupled to the computing device 116; operators 122, 126, 130, 134, 138 and scanners 120, 124, 128, 132, 136, (e.g., Bluetooth™ wireless scanners), which may be wearable by the operators and that communicate with the transceiver 118. In some implementations, the RF transceivers 114, 108, 110, and 112 may be replaced by wired communications devices; and/or in some implementations, the BT transceivers 118 and the BT wireless scanners 120, 124, 128, 132, 136 may be replaced by wired scanner devices.

The delivery items to be sorted 140 may be mail pieces having delivery address indicia (e.g., a barcode(s) and/or a text address) that is manually scanned by the operators, such as the operator 122 using the scanner 120, according to one implementation. In some implementations, the scanners 120, 124, 128, 132, 136 may be wearable wireless scanners that utilize Bluetooth™ technology, for example, the model RS507 cordless ring imager by the Zebra Company of Lincolnshire, IL or the Honeywell 8670 wireless ring scanner. In other implementations, the scanner may be a digital camera that is communicatively connected to the computing device 116, a camera-equipped smart phone, or the like. In some implementations, the scanner's RF access point, such as the Bluetooth™ transceiver 118, may support up to a maximum number of wireless imagers or scanners 120, 124, 128, 132, 136, such as a maximum of seven. Additional Bluetooth access points (not shown) may be used to increase this number. In additional or alternative implementations, or one or more wired scanners, which may or may not be stationary, can be connected to the computing device 116.

In some implementations, the scanners 120, 124, 128, 132, 136 may signal a successful scan, transmission, and/or processing with a green light and/or a positive audio feedback, such as a short beep; and may signal an unsuccessful scan, transmission, and/or processing (e.g., for an invalid barcode or failed scan) with a red light and/or a negative audio feedback, such as a long beep, which alerts the operator to handle the delivery item 140 differently than usual.

In various implementations, the computing device 116 with sort software includes or has operable access to a storage device (not shown) or machine-readable (e.g., computer-readable) medium that stores the sort software and/or a sort plan that indicates sort output locations for various delivery addresses. In various implementations, the computing device 116 is operably connected to a network (not shown) that enables communication with other computing devices (not shown) that may perform related ancillary functions, such as returning a ZIP code that corresponds to a unique identifier (e.g., a tracking barcode) from a delivery item 140.

In one implementation, the sort software interfaces with, communicates with, or includes Manual Sortation Appliance (MSA) computer software developed by the USPS. In various implementations, the MSA software determines the sort output location for a mail piece by identifying or determining the mail piece's destination ZIP code from data received from the scanners 120, 124, 128, 132, 136; then comparing the ZIP code to the current sort plan to determine a ZIP-code range or group into which the ZIP code falls, and which is assigned to a specific sort output location, which may correspond to or represent, e.g., a physical location in the processing/sorting facility, such as the location of, or a, specific container for delivery items in that ZIP-code range or group.

In some implementations, the delivery items that are to be sorted 140 are a subset of the mail pieces which are processed by a processing/sorting facility. For instance, items to be sorted 140 using the Sort to Indicator system 100 may be items that cannot be or is not typically processed by automated sorting equipment, such as large or oddly shaped items or parcels (e.g., snow skis), or ordinary mail items that were rejected by or unsuitable for automated equipment for some reason and consequently require manual sorting.

In the example of FIG. 1, the items to be sorted 140 typically have address information in the form of a barcode that contains a destination delivery code or postal code (e.g., a ZIP code encoded in a barcode), and/or a unique identifier that can be used to determine the delivery or postal code of the destination (e.g., an Intelligent Mail barcode). The operators 122, 126, 130, 134, 138 pick up or otherwise handle one of the mail items 140 and use the scanners 120, 124, 128, 132, 136 to obtain, capture, or scan the address information (e.g., barcode) from each item 140. In some instances, the address information may be in the form of letters and numbers that represent the destination/delivery address in writing. In some implementations, if an item 140 does not have a scannable or usable barcode, then the computing device 116 and/or the scanner 120 may recognize or identify the destination address information, such as the postal code, using optical character recognition (OCR) of the numbers and letters on the item 140. In some other implementations, if an item 140 does not have a scannable or usable barcode, then the operator 122, 126, 130, 134, 138 may visually read and enter the destination address information (e.g., the postal code) into the computing device 116 and/or the scanner 120, e.g., via a keyboard, touch screen, or speech recognition interface.

In various implementations, the scanned destination address information, such as the destination postal code, is transmitted by one of the wireless scanners, such as scanner 120, and received by the computing device 116 via the Bluetooth transceiver 118, which is operably connected to the computing device 116. In various implementations, the scanner 120 also transmits, with the postal code, an identifier that uniquely identifies the scanner 120, and which is received by the computing device 116 via the Bluetooth transceiver 118 along with the address information. According to some such implementations, the identifier that identifies a specific one of the wireless wearable scanners 120, 124, 128, 132, 136 is the unique media access control (MAC) address of each particular scanner.

In various implementations, the destination address information, e.g., the destination postal code, from each of the delivery items 140 is used by the sort software on the computing device 116 to determine or identify one of the indicator devices 102, 104, 106, which are each at or associated with one of the sort output locations. For example, after reception, the computing device 116, e.g., executing the sort software and using, based on, or according to a predetermined sort plan, determines the proper sort output location and its associated indicator device 102-106 for the item 140 that was scanned. In certain implementations, each indicator-equipped sort output location is or includes a container for delivery items that are destined for a general delivery area or areas, which area(s) may be specified by a postal-code range or group. For example, the container at the location "A" with the indicator device 102 may be for mail pieces 140 having ZIP codes from 20100-29999; the container at location "B" with the indicator device 104 may be for mail pieces 140 having ZIP codes from 30000-39999; and the container at location "C" with the indicator device 106 may be for mail pieces 140 having ZIP codes from 70000-79999, according to the sort plan. In various implementations, the delivery codes or postal codes may be a continuous range (as in the example above) or a non-continuous group, (such as 30000-31999 and 39800-39999). In some implementations, the computer 116 may also upload the scanned barcode/address information to a central tracking system which enables more accurate tracking of the mail piece and creates visibility of the mail flow.

In various implementations, after determining the correct indicator device 102-106 and sort output location for an item 140, the computing device 116 sends or transmits information, such as a command(s) specifying a designator (e.g., a visual or audio signal, display, or presentation that is recognizable by a human operator, such as a specific color, pattern, sound, or the like) that is associated with one particular scanner, from the RF transceiver 114 to the determined specific one of the indicator devices 102-106, via its associated transceiver 108-112, to cause that indicator device to produce, display, provide or otherwise present the appropriate designator for that one particular scanner (e.g., a specific color, such as blue), which designator is recognizable by the operator that scanned that item 140 using that particular scanner. In the example of implementations that use lights or LEDs as or included with the indicator devices 102-106, the command(s) from the computing device 116 may cause the illumination of one or more lights/LEDs in a designated color (e.g., blue) or pattern or sequence, and the lights/LEDs may be positioned near (e.g., above) the container that is the sort output location for a specified range of ZIP codes.

Figure 4:
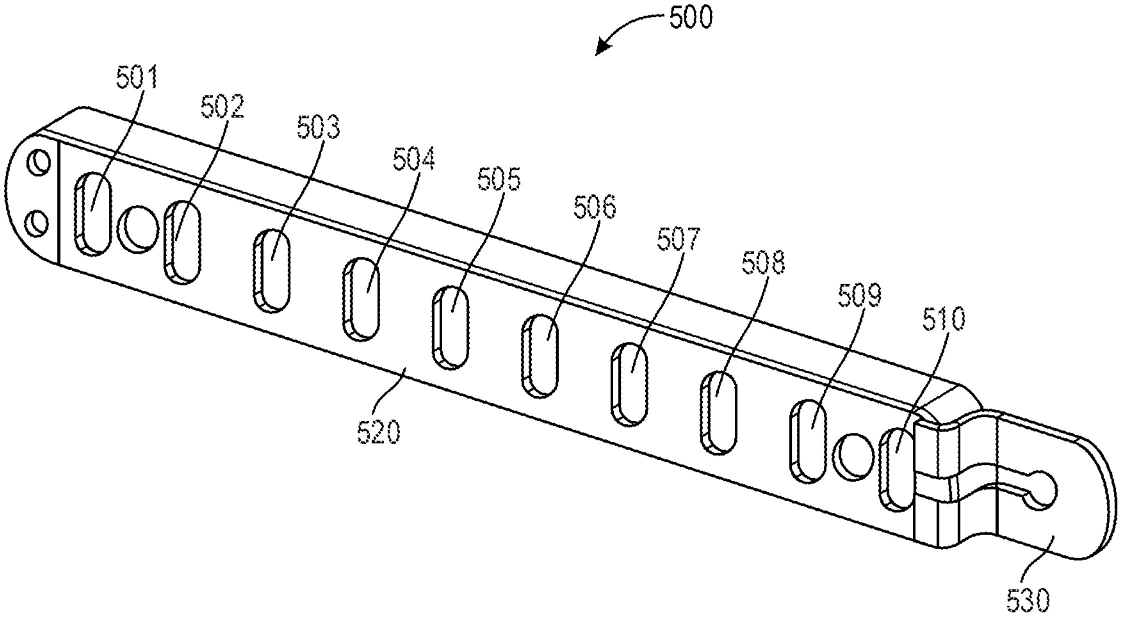
FIG. 4 is a diagram of an example of an illuminated indicator device that can be used in processing and sorting delivery items according to one implementation.

As just noted, in various implementations, each of the indicator devices 102-106 may be a remote-and-computer-controlled strip or group of multicolor LEDs—i.e., LEDs that can display more than one color, for example as shown and described with respect to FIG. 4. In various implementations, the indicator devices 102-106 may additionally or alternatively be monitors or the like (e.g., display devices such as flat-panel liquid crystal display (LCD) or organic light-emitting diode (OLED) screens), which can display different colored panels, different colored windows, characters, symbols, text, or the like that designates the sort output location for each scanner 120, 124, 128, 132, 136. The designator notifies the operator regarding where to place/sort the delivery item.

Upon seeing, hearing, detecting, recognizing or otherwise being notified by the designator (e.g., a blue light) presented by one of the indicator devices 102-104, the operator using the scanner that is associated with that designator (e.g., the blue scanner 136) moves, places, or otherwise sorts the scanned item 140 into the sort output location A, B, or C associated with the designator-presenting indicator device 102-106 (e.g., into a bag in rack "A" that is below the indicator device 102 that is displaying the blue-light designator).

As shown in FIG. 1, multiple operators (e.g., five in the non-limiting example of FIG. 1) can be supported in the same manual sorting area by using or assigning different designators, such as colors, for each scanner/operator pairing. In the example of FIG. 1, operator 122 uses wireless scanner 120 and is assigned the color red as a designator, operator 126 uses wireless scanner 124 and is assigned the color white as a designator, operator 130 uses wireless scanner 128 and is assigned the color green, operator 134 uses wireless scanner 132 and is assigned the color yellow, and operator 138 uses wireless scanner 136 and is assigned the color blue. It is to be understood that scanners and colors assigned to individual operators are not fixed and can be dynamically reassigned, as needed, due to personnel changes, changes in scanner hardware, and changes to the sort plan. It is to be further understood that the designators are not limited to the colors shown, or even to the use of colors or other visual-type designators—for example audible designators could be used additionally or alternatively; and/or mono-color LEDs could be used, where the LED's position or pattern in an LED strip is the designator; and/or text or numbers on a monitor or screen could be used as a designator, etc.

Additionally, in some implementations, the Sort to Indicator system 100 may support multiple sort areas that are similar to the sort area shown in FIG. 1, where the multiple areas can be controlled by one computing device 116 by networking their indicator devices with the computing device 116 and the indicator devices 102, 104, 106. In such implementations, the computing device 116 may control additional indicator devices for multiple sort areas using different node numbers and network numbers for the additional indicator devices and their RF transceivers. In some such implementations, the computing device 116 may use a different sort plan (e.g., like sort plan 162) to support the multiple sort areas at the same time, such as up to approximately seven different sort plans to support seven different sort areas that are similar to the sort area shown in FIG. 1, although only one has the computing device 116.

In still other implementations, the computing device 116 may record and analyze data reflecting the actions of the operators 122, 126, 130, 134, 138 while performing sorting tasks using the Sort to Indicator system 100, such as how long in time it takes an operator to scan an item and place it in an output location, how long it takes an operator between item scans, the number of items 140 processed by an operator per hour, number of sorting errors by an operator, and the like. The analysis may produce metrics indicating each operator's productivity, efficiency, error rate, average time to sort a package, and the like.

Figure 2:
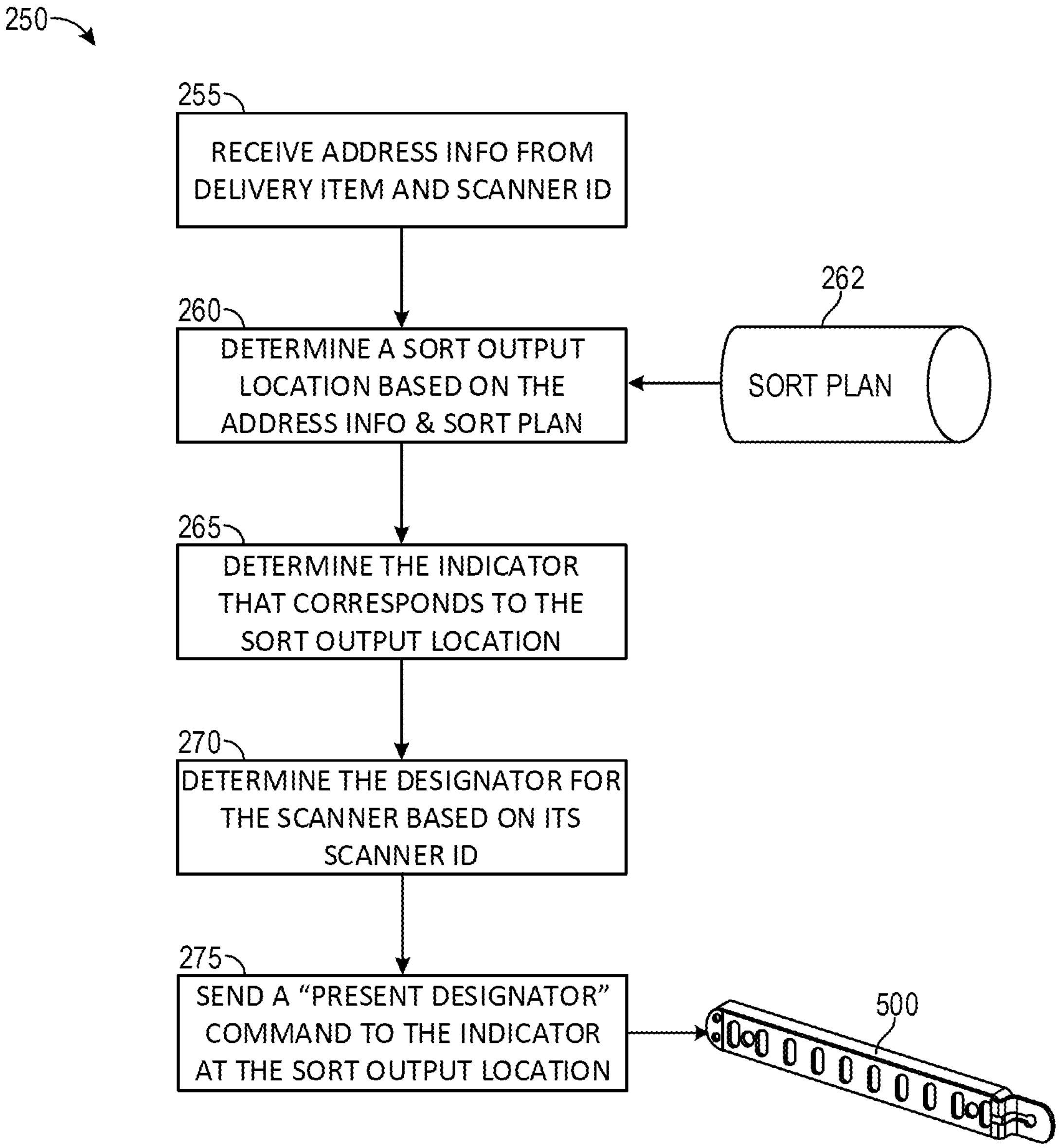
FIG. 2 is a flowchart illustrating an example of a method of sorting delivery items using the system of FIG. 1, according to one implementation.

FIG. 2 is a flowchart illustrating an example of a method 250 for sorting delivery items using the system of FIG. 1, according to one implementation. The method 250 will be described with continued reference to the operation of the Sort to Indicator system 100 shown in FIG. 1. In various implementations, the operations, functions, instructions, blocks, or steps of the method 250 may be performed or executed by or using a computer or the like, such as the computing system 116 of FIG. 1, which may access and/or control appropriate peripheral devices, such as a storage device 262, transceivers 108-114, indicator devices 102-106, and controllers 602.

The method 250 starts at operation 255 with receiving address information from a delivery item along with an identifier of the device (e.g., scanner) that gathered and sent the address information. For example, the "red" operator 122 may use the "red" scanner 120 to scan an item to be sorted 140, and the scanner 120 may detect, record, or capture the delivery address information, such as a delivery postal code, on the item 140. The "red" scanner 120 may wirelessly send data to the computing device 116, which receives the data via the Bluetooth transceiver 118. The data may include the address information from the scanned delivery item 140, including the delivery postal code, and an identifier associated with the "red" scanner 120, such as the scanner 120's unique MAC address.

At operation 260, the method 250 looks up, identifies or otherwise determines a sort output location for the delivery item 140 based on the received address info and a sort plan 262 that may be stored in a storage device. In various implementations, the sort plan 262 specifies or defines how to group by general delivery area (e.g., by state, by destination postal code, or the like) the current batch of items to be sorted 140. The sort plan 262 indicates how all of the delivery items 140 going to the same general destination area get grouped or sorted into the same output location, such into the same bag, bundle, tray or other container. In various implementations, the sort plan 262 may specify the destination areas using a ZIP code range and/or a group of ZIP codes. Typically, sort plans include a "leftovers" output location, to which all the items 140 that don't fall into one of the sort plan's other general destination areas are sorted. In various implementations, as shown, the sort plan 262 may be stored in a computer-readable medium that is accessible by the computing device 116 and the sort plan 262 may change for sorting each different batch of items 140.

In some implementations, the sort plan may be represented as a table or other data structure similar to Table 1 below:

TABLE 1

| ZIP Codes | Sort Output Location | Corresponding Indicator Device ID |
|---|---|---|
| 20100-29999 | A | 102 |
| 30000-39999 | B | 104 |
| 70000-79999 | C | 106 |

Consider an example using Table 1 and FIG. 1 and an item 140 that has a destination ZIP code of 20170, where the computing device 116 may determine the sort output location for the scanned item 140 by comparing the scanned item 140's ZIP-code address information (e.g., 20170) to the sort plan ZIP code groupings in the left column, and then looking up or identifying the corresponding sort output location in the center column of the same row of Table 1, which is sort output location "A". Thus, the sort plan may be used by the sort software running on the computing device 116 to map an item's ZIP code to a specific sort output location A, B, C.

At 265, the method 250 looks up, identifies or otherwise determines the indicator device that corresponds to the sort output location that was determined in operations 260. Continuing the same example using Table 1 and FIG. 1 and the item with ZIP code 20170, the computing device 116 may determine the indicator device that corresponds to the sort output location by looking up or identifying the indicator-device identifier that corresponds to the sort output location A in the right column of the same row of Table 1, which is indicator-device ID "102." Thus, the sort plan may be used by the sort software running on the computing device 116 to map an item's sort output location to a specific indicator device 102, 104, 106. Although this example uses a single data structure as represented in Table 1 to map or correlate address information (e.g., ZIP codes) with sort output locations and with indicator-device identifiers, in other implementations two separate data structures may be used: a sort plan structure that maps address information (e.g., ZIP codes) to sort output locations and another structure that maps sort output locations to indicators.

At operation 270, the method 250 looks up, identifies or otherwise determines the designator associated with the scanner that sent the address info, based on the identifier for that scanner, which was received in operation 255. In some implementations, the designator may be a color, such as red for scanner 120, white for scanner 124, green for scanner 128, yellow for scanner 132, and blue for scanner 136, as shown FIG. 1. In various implementations, the scanners 120, 124, 128, 132, and 136 may be labelled or painted with, or have a screen that displays, their designator color so that the operator of each scanner will recognize the correct designator color when it is displayed or presented by the indicator devices 102-106.

In some implementations, the relationship between a scanner and its designator may be represented as a table or other data structure similar to Table 2 below:

TABLE 2

| Scanner Identifier | Designator |
|---|---|
| 120 | red |
| 124 | white |
| 128 | green |
| 132 | yellow |
| 136 | blue |

Continuing the same example using the item 140 having ZIP code 20170, and given that the operator 122 used the scanner 120 to scan the item 140, then the computing device 116 may determine the designator that corresponds to the scanner having the identifier 120 by looking up or identifying the designator that corresponds to the scanner identifier 120 in the right column of the same row of Table 2, which is the designator "red." In some other implementations, the scanner 120 may provide (e.g., transmit) its designator, e.g., "red", to the computing device 116 with its identifier and the address information captured from the item 140 (e.g., as part of operation 155), and the computing device 116 may determine the designator by simply reading it from the data received from the scanner 120.

At 275, the method 250 transmits or otherwise sends a command to the indicator device 500 that corresponds to the sort output location, where the command causes the indicator device 500 to produce, render, or otherwise present the designator that was determined in operation 265.

Continuing the same example above where the appropriate designator is "red" and the appropriate indicator device is indicator device 102, computing device 116 may wirelessly send, via the RF transceiver 114 a command to display a red light to the indicator device 102, which receives the command via its RF transceiver 108.

Upon receiving the command of operation 275, the indicator device 102 switches on, illuminates, or otherwise presents the commanded designator, such as a red light, LED, display area of a monitor, or the like. Upon seeing the red-light designator on the indicator device 102, the operator 122 of the scanner 120 moves the item 140 that he/she just scanned to the sort output location A, which is associated with the indicator device 102. After sorting the scanned item into the proper location, the operator 122 may then scan a new item to be sorted 140, which triggers a new iteration of the method 250.

As shown in the examples of FIGS. 2 and 4, in one possible implementation the indicator device 102 may be a remote-controlled strip of multicolor LEDs, which may be commanded to illuminate in various colors and/or patterns and/or sequences, which act to designate to an operator 122, 126, 130, 134, 138 that the item 140 they have just scanned should be placed at the sort output location of the indicator. In this implementation, the computing device 116 transmits instructions via the RF transceiver 114 to illuminate a specific LED(s) of the LED-strip indicator device 102 with the specific color (e.g., red) that is the designator assigned to the scanner 120 and its operator 122.

In various implementations, the indicator device 102 may transmit an acknowledgment back to the computing device 116 via the RF transceiver 108 and the RF transceiver 114. The acknowledgment be a digital message with data indicating that the command(s) were received at the indicator device 102 and indicating that the appropriate designator was presented, for example, that the appropriate LED(s) was illuminated in the specified color.

According to certain implementations, if the appropriate designator cannot be presented (e.g., due to a hardware or communications failure), the indicator device 102 may transmit a maintenance message back to the computing device 116 via the RF transceiver 108 and the RF transceiver 114. In some such implementations, if a maintenance indication is transmitted, a maintenance indicator can be audibly or visually presented by the indicator device 102. For example, the indicator device 102 may blink a 'maintenance required' light pattern or produce a "maintenance required" sound if it cannot process a command from the computing device 116.

In some implementations, the indicator device 102 may include or be connected to a sensor that senses when an item 140 has been placed in the sort output location A that is associated with the indicator device 102. In response to detecting that the item 140 has been placed in the correct sort output location (e.g., in a bin, sack, container or the like), the indicator device 102 may cease or stop presenting the designator (e.g., turn off the red LED(s)). In such implementations, the indicator device 102 may also transmit the sensor data back to the computing device 116 via the RF transceiver 108 and the RF transceiver 114 so that the sort software on the computing device 116 can confirm that the scanned item 140 was placed in the appropriate sort output location. In some additional or alternative implementations, the indicator device 102 may cease presenting (e.g., turn off) the designator after a predetermined time period that allows the operator to efficiently move the item 140 to the sort output location, such as 5 seconds, 10 seconds, 15 seconds, 20 seconds, or the like. In some implementations, ceasing to present (e.g., turning off) the designator may be done independently by the indicator device 102 or in response to a "cease" command that is sent by the computing device 116 after determining that the predetermined time period has elapsed. In still other additional or alternative implementations, instead of based on time, the computing device 116 may send a "cease" command for a given designator (e.g., red) when the scanner for that designator (e.g., the red scanner 120) subsequently scans another delivery item 140 and transmits the scan data to the computing device 116. In other words, the next scan by a given scanner triggers the "cease" command.

In various implementations, the methods, processes and/or some or all of the operations described herein for the computing device 116 and/or the indicator devices 102-106 and/or the controller 602 and/or the scanners 102, etc., may be fully or partially embodied on one or more computer-readable, non-transitory storage media or device that include instructions that are executed by a processor, e.g., the processor of a computing system.

Figure 3:
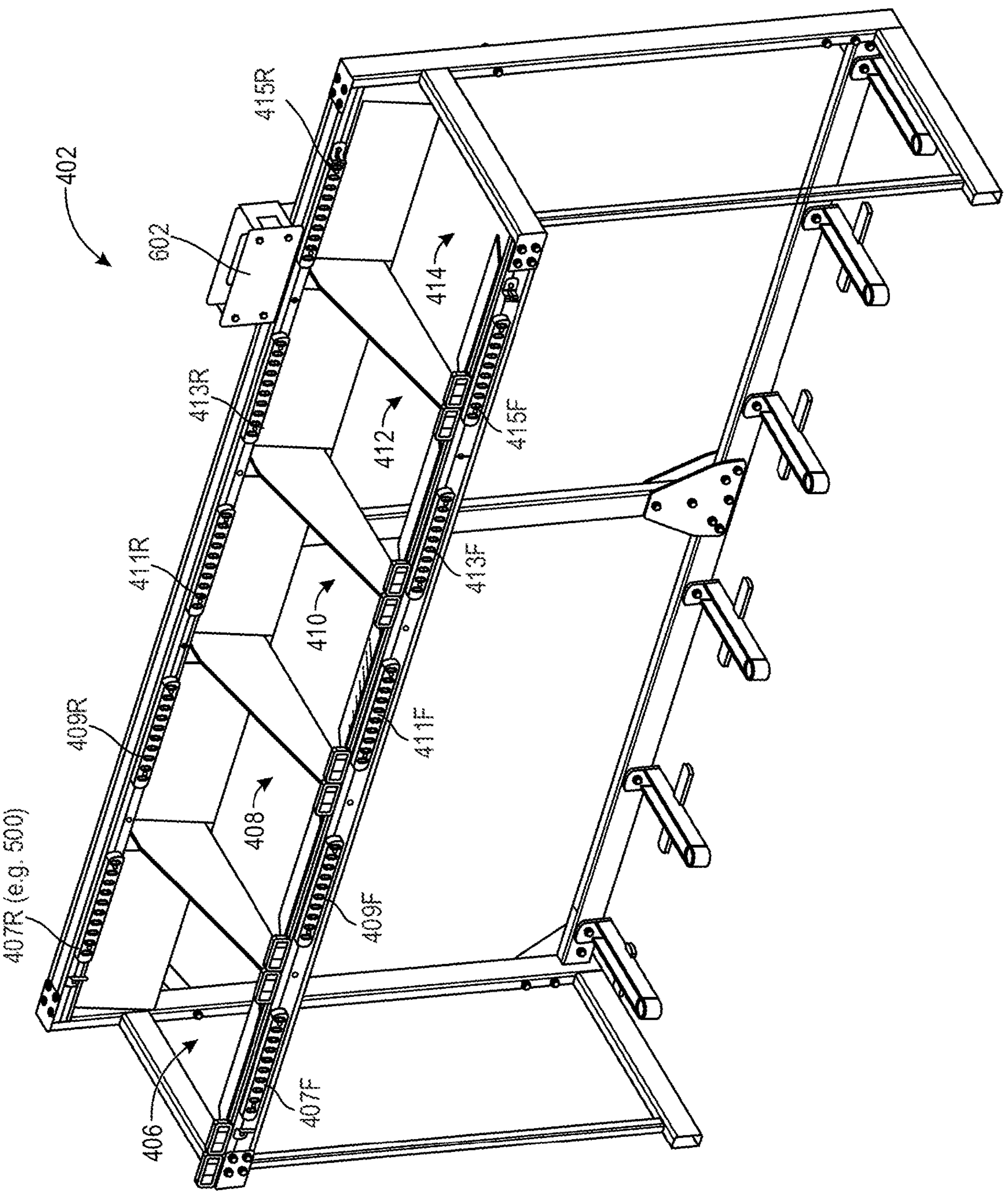
FIG. 3 depicts an example of a rack that defines five sort output locations and that includes two indicator devices (one front and one rear) for each of the sort locations, according to one exemplary implementation.

FIG. 3 depicts an example of a frame or rack 402 that defines five sort output locations 406, 408, 410, 412, 414 and that includes two indicator devices (one front and one rear) for each of the sort locations, according to one exemplary implementation. In the example shown, the rack 402 defines openings for the five sort output locations or openings 406, 408, 410, 412, 414, with frames from which mail sacks or bags may be hung, or under which containers, such as wheeled barrels or carts, may be positioned, such that delivery items dropped through the openings 406, 408, 410, 412, 414 fall into the sacks or other containers. In some embodiments, the rack 402 may be configured and sized to accommodate spinner carts, which are wheeled carts from which mail sacks or bags are hung (as opposed to being hung from the rack 402). With reference to FIGS. 5 and 1, and using the rack 402 in the system 100 of FIG. 1, the sort output location 406 of FIG. 5 could be the sort output location A of FIG. 1; the sort output location 408 of FIG. 5 could be the sort output location B of FIG. 1; and the sort output location 410 of FIG. 5 could be the sort output location C of FIG. 1.

In the implementations shown, the rack 402 may be known as a Sort to Light Frame (STLF) and is made of metal (e.g., steel) members to which are mounted front indicator devices 407F, 409F, 411F, 413F, and 415F, and rear indicator devices 407R, 409R, 411R, 413R, and 415R. As shown, the indicator devices may be LED-strip indicator devices as described with respect to FIG. 4, or other visual indicator devices, such as LCDs or incandescent lights. By being positioned, configured, or mounted in close proximity to—in this example directly in front of and behind—the sort output locations 406, 408, 410, 412, 414, it is clear which two indicator devices are linked to, associated with, or are indicators for, each of the sort output locations.

Figure 5B:
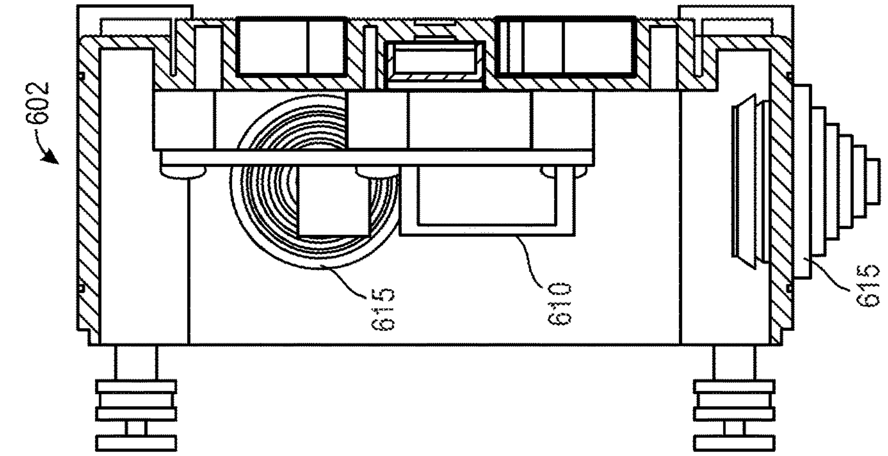
FIG. 5B depicts a side view of the wireless indicator-device controller that can be used in processing and sorting delivery items according to one implementation.
Figure 5A:
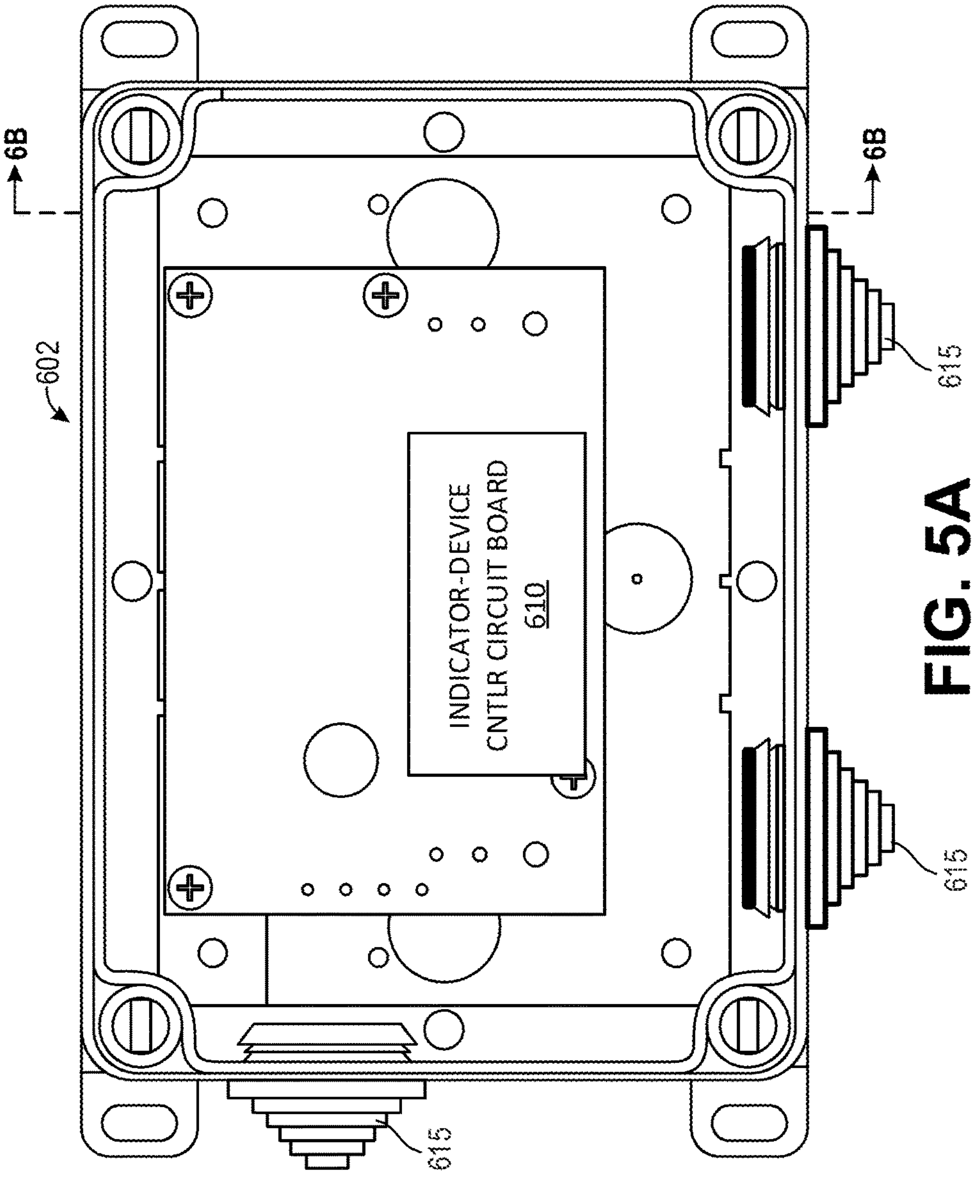
FIG. 5A depicts a top view of an example of a wireless indicator-device controller that can be used in processing and sorting delivery items according to one implementation.

As shown in FIG. 3, the rack 402 may also have mounted on it an indicator-device controller 602 as described with respect to FIGS. 5A and B. The indicator-device controller 602 is connected to the front indicator devices 407F, 409F, 411F, 413F, and 415F, and to the rear indicator devices 407R, 409R, 411R, 413R, and 415R by wires, cables, or the like, which are not shown in FIG. 3. In various embodiments, the indicator-device controller 602 includes or contains an RF transceiver 108-112 as described previously.

It should be noted that other implementations may use only a single indicator device for each of the sort output locations 406, 408, 410, 412, 414, such as only the rear indicator device 407R for the sort output location 406; only the rear indicator device 409R for the sort output location 408; only the rear indicator device 411R for the sort output location 410; etc.

FIG. 4 is a diagram of an indicator device 500 that can be used in processing and sorting delivery items according to one exemplary implementation. According to various implementations, the indicator device 500 can be embodied as a remote-controlled light or LED strip assembly. In one such implementation as shown, the device 500 can include ten individually addressable red green blue (RGB) multicolor LEDs 501-510, which may be mounted on a printed circuit board inside a case or housing 520, which may be an acrylonitrile butadiene styrene (ABS) plastic housing. The LEDs 501-510 are controllable to switch on and off and to emit or present any of the various colors that can be formed from combinations of red, green, and blue light. In various embodiments, the indicator device 500 may be connected to and controlled by a controller, such as the wireless indicator-device controller 602 described in FIGS. 5A and 5B.

In certain implementations, the LEDs 501-510 in the indicator device 500 are controlled in pairs, which allows two-LED designators for up to five different scanners/operators. For example, each pair of LEDs (e.g., LEDs 501 and 502, LEDs 503 and 504, etc.) can be illuminated using the five distinct designator colors described in FIG. 1—namely, red, white, green, yellow, and blue, which may be produced by mixing red, green, and blue light in different intensities, where each color is assigned as the designator for one scanner/operator. In other implementations, the indicator device's LEDs 501-510 may be controlled singly, allowing up to ten LED designators for up to ten different scanners/operators. Other variations are possible.

In various implementations, for example as shown in FIG. 3, there may be more than one LED strip indicator device 500 associated with each sort output location, such as rear indicator device 407R and front indicator device 407F for sort output locations 406. Thus, the implementation shown in FIG. 3 may support up to 20 different scanners/operators if the LEDs 501-510 are controlled singly to provide designators or up to 10 different scanners/operators if the LEDs 501-510 are controlled in pairs. Other variations are possible; for example the front and rear indicator devices may duplicate each other and thus support no more than 10 different scanners/operators.

In certain implementations, the indicator device 500 may include a bracket(s) 530 to hold or mount the indicator device 500 and wiring harnesses (not shown) to serially connect the individual indicator devices 500 to each other and to the wireless indicator-device controller 602.

FIG. 5A depicts a top view of a wireless indicator-device controller 602 with its cover removed that can be used in processing and sorting delivery items according to one exemplary implementation. In some implementations, the wireless indicator-device controller 602 connects to and is operable to control the indicator devices 102-106, 500, to communicate wirelessly with a computing device, such as the computing device 116 of FIG. 1, and to process and implement the commands received from the computing device 116, among other things.

In the implementation shown, the wireless indicator-device controller 602 includes at least one indicator device circuit board 610, which includes a microprocessor, microcontroller, and/or logic circuits and hardware to perform the controller 602's functions. In some implementations, controller 602 may include a housing 620 (e.g., an ABS plastic housing), cable mounts and seals 615, and wiring harnesses (not shown) for electrically and communicatively connecting the indicator-device controller 602 to one or more indicator devices 102-106, e.g. indicator device(s) 500 of FIG. 4.

According to certain implementations, the indicator-device controller 602 communicates wirelessly with the RF transceiver 114 of the computing device 116 using a 915 MHz radio transceiver, which may be connected via a cable harness or which may be part of the circuit board(s) inside the housing 620. As noted previously, in some such implementations, to help ensure that the correct designator(s) is displayed when an RF message/command did not transfer properly to the controller 602, the controller 602 may periodically refresh the indicator device(s) 500, such as every 100 or 200 milliseconds or the like and/or may shut off previously received designators after a predetermined time period, such as 20 seconds.

In some implementations, a command received by the controller 602 from the computing device 116 may be or include a data array representation of all LEDs of an indicator device 500 or of all the indicator devices controlled by the controller 602 (e.g., 102-106, 407F, 409F, 411F, 413F, 415F, 407R, 409R, 411R, 413R, 415R), where the data in each array position indicates either a designator (e.g. color) to present by an LED or an "off" state for the LED. This array-representation command can be transmitted to the transceiver 102, 104, 106, 602 that is associated with controlling the indicator device(s) 500, 102-106, 407F, 409F, 411F, 413F, 415F, 407R, 409R, 411R, 413R, 415R.

In some embodiments, the controller 602 may calculate or determine the number of LEDs of the indicator device 500 to turn on in each designator color based on how many scanners currently have scanned items 140 that need to be sorted to the output location that is equipped with the indicator device 500, so as to maximize the number of LEDs illuminated in each color of ease of visibility and designation. For example, if only one scanner/operator has scanned a delivery item that goes to a given sort output location, then the controller 602 may illuminate all ten LEDs at that output location in the designator color assigned to that scanner/operator. Continuing the example, if two scanners/operators have scanned items 140 that go to the same sort output location, then the controller 602 may illuminate five LEDs in each of the two designator colors assigned to each of the two scanners/operators. Similarly, if three or more scanners/operators scan barcodes that go to the same destination, then the controller 602 may illuminate two LEDs in each of the three or more designator colors assigned to each of the three or more scanners/operators, etc. In embodiments that control the LEDs of the indicator device 500 in pairs, the controller 602 may illuminate ten, five and two LEDs, respectively, in the examples described in this paragraph. In some other embodiments, the calculations, determinations and functions described in this paragraph may instead be performed by the computing device 116, and the output may be sent to the controller 602 in a command(s).

FIG. 5B depicts a side view of the wireless indicator-device controller 602 shown in FIG. 5A.

Figure 6:
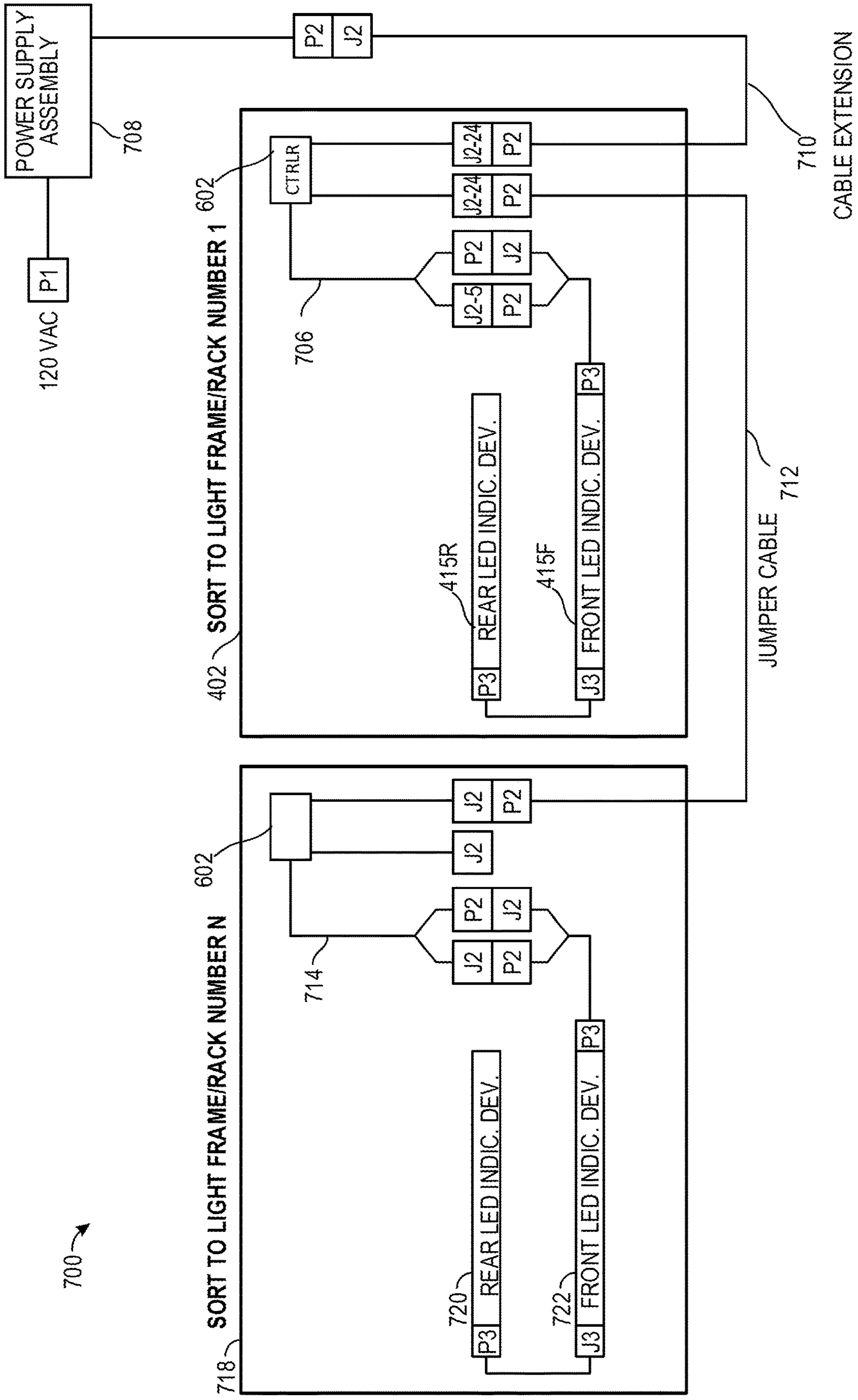
FIG. 6 schematically depicts an example of electrical system components that can be used in processing and sorting delivery items according to one implementation.

FIG. 6 schematically depicts an example of the electronic components 700 that can be used in processing and sorting delivery items according to one implementation. As shown in this example, the components 700 include a power supply assembly 708 that accepts 120 volt alternating current power and outputs direct current power as needed by the controllers 602 and indicator devices 415, 720, 722, such as 24V DC, sort to light frames or racks 402, 718, a cable extension 710 (if needed) to connect the first sort to light frame 402 to the power supply 708, a jumper cable 712 to connect the first sort to light frame 702 the next sort to light frame 718 in a series of N sort to light frames included in the system components 700, where N can be two or more, such as five. In FIG. 7, cable plugs a denoted with P2 and the joiners that connect to the plugs are denoted by J2 and the like.

As shown in FIG. 7, the first sort to light frame 402 includes an indicator-device controller 706 (e.g., as described in FIGS. 5A and B), a rear LED indicator device 415R and a front LED indicator device 415F (e.g., as described in FIGS. 3 and 4). Similarly, the last (e.g., Nth) sort to light frame 718 included in the system components 700 includes an indicator-device controller 706, a rear LED indicator device 720 and a front LED indicator device 722. Although, for clarity of explanation regarding connecting together multiple racks, the implementation shown in FIG. 6 includes only a single pair of indicator devices for each rack 402, 718, (which means that each of the racks 402, 718 services only a single sort output location), it will be appreciated that in other implementations each of the racks 402, 718 could service multiple sort output locations and could include several pairs of indicator devices. For example, each of the racks 402, 718 could support five sort output locations, and the corresponding indicator devices, as shown in the implementation depicted in FIG. 3.

One of ordinary skill will recognize that the systems, components, computer-readable media, methods, processes, functions, and operations described herein are examples that can be included in implementations consistent with present invention, and the examples are not intended to be limiting. In other implementations, additional, or fewer, or substitute systems, components, computer-readable media, methods, processes, functions, and operations could be used within the scope of the invention. Similarly, the examples of steps, functions, operations disclosed in the examples herein could, in other implementations, be performed in a different order, in parallel, in an overlapping manner, etc., within the scope of the invention.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, computer readable media, delivery item processing systems, and/or component parts or other aspects thereof can be used in various combinations.

What is claimed is:

1. A delivery item sorting system for designating an output location to a scanner operator, the system comprising:

- a first scanner that captures address information from delivery items;
- a second scanner that captures address information from delivery items;
- a plurality of indicator devices associated with a plurality of sort output locations; and
- a processor that is operably connected to the first scanner, the second scanner, and the plurality of indicator devices, and that is configured to perform operations comprising:
  - receiving, from the first scanner, address information from a first delivery item;
  - determining, based on the address information from the first delivery item and a sort plan, a sort output location for the first delivery item from among the plurality of sort output locations;
  - causing a first indicator device that is associated with the determined sort output location to present a first designator that is associated with the first scanner;

receiving, from the first scanner, second address information from a second delivery item;

causing the first indicator device to cease presenting the first designator, in response to receiving the second address information;

receiving, from the second scanner, address information from a third delivery item; and causing a second indicator device from among the plurality of indicator devices to present a second designator that is associated with the second scanner.

2. The system of claim 1, wherein the plurality of indicator devices comprises a plurality of light emitting diodes.

3. The system of claim 1, wherein the first designator is a first light, and wherein causing the first indicator device that is associated with the determined sort output location to present a first designator comprises sending a signal to the first indicator device that causes the first indicator device to emit the first light.

4. The system of claim 3, wherein causing the first indicator device to cease presenting the first designator comprises sending a signal to the first indicator device that causes the first indicator device to cease emitting the first light.

5. The system of claim 1, wherein the operations further comprise:

waiting for a predetermined time period after causing the second indicator device from among the plurality of indicator devices to present the second designator; and causing the second indicator device to cease presenting the second designator, after the predetermined time period.

6. The system of claim 1, wherein the plurality of indicator devices comprise a plurality of display areas on one or more monitor.

7. The system of claim 1, wherein the address information comprises a postal code.

8. The system of claim 1, wherein the sort plan includes a mapping of postal codes to sort output locations.

9. The system of claim 1, wherein the sort output locations correspond to containers that hold delivery items.

10. A method, performed by one or more processors, for designating locations for sorting delivery items, the method comprising:

receiving, from a first scanner, address information from a first delivery item;

determining, based on the address information from the first delivery item and a sort plan, a sort output location for the first delivery item from among a plurality of sort output locations;

causing a first indicator device from among a plurality of indicator devices to present a first designator that is associated with the first scanner, wherein the first indicator device is associated with the determined sort output location;

receiving, from the first scanner, second address information from a second delivery item;

causing the first indicator device to cease presenting the first designator, in response to receiving the second address information;

receiving, from a second scanner, address information from a third delivery item; and causing a second indicator device from among the plurality of indicator devices to present a second designator that is associated with the second scanner.

11. The method of claim 10, wherein the plurality of indicator devices comprises a plurality of light emitting diodes.

12. The method of claim 11, wherein the first designator is a light, and wherein causing the first indicator device to present the first designator comprises sending a signal to the first indicator device that causes the first indicator device to illuminate.

13. The method of claim 10, wherein causing the second indicator device to present the second designator comprises sending a signal to the second indicator device that causes the second indicator device to present the second designator that is associated with the second scanner, wherein the second indicator device is associated with the sort output location for the second delivery item.

14. The method of claim 13, further comprising:

waiting for a predetermined time period after sending the signal to the second indicator device; and causing the second indicator device to cease presenting the second designator, after the predetermined time period.

15. The method of claim 10, wherein the plurality of indicator devices comprise a plurality of display areas on one or more monitor.

16. The method of claim 10, wherein the address information comprises a postal code.

17. The method of claim 10, wherein the sort plan includes a mapping of postal codes to sort output locations.

18. The method of claim 10, wherein the sort output locations correspond to containers that hold delivery items.

19. A computer-readable, non-transitory storage medium storing instructions that, when executed by one or more processor, cause the one or more processor to perform operations for controlling a plurality of indicator devices to designate a location for sorting delivery items, the operations comprising:

receiving, from a first scanner, address information from a first delivery item;

determining, based on the address information from the first delivery item and a sort plan, a sort output location for the first delivery item from among a plurality of sort output locations;

causing a first indicator device from among a plurality of indicator devices to present a first designator that is associated with the first scanner, wherein the first indicator device is associated with the determined sort output location;

receiving, from the first scanner, second address information from a second delivery item;

causing the first indicator device to cease presenting the first designator, in response to receiving the second address information;

receiving, from a second scanner, address information from a third delivery item; and causing a second indicator device from among the plurality of indicator devices to present a second designator that is associated with the second scanner.

20. The computer-readable, non-transitory storage medium of claim 19, wherein the indicator device comprises a plurality of light emitting diodes.

21. The computer-readable, non-transitory storage medium of claim 19, wherein the plurality of indicator devices comprise a plurality of display areas on one or more monitor.

* * * * *